United States Patent [19]
Salway et al.

[11] 3,913,064
[45] Oct. 14, 1975

[54] VEHICLE WARNING SYSTEMS

[75] Inventors: Peter Hugh Salway, Birmingham; Andrew Stephen Todd, Stafford, both of England

[73] Assignee: The Lucas Electrical Company, Birmingham, England

[22] Filed: Feb. 1, 1974

[21] Appl. No.: 438,660

[30] Foreign Application Priority Data
Mar. 3, 1973 United Kingdom............... 10453/73

[52] U.S. Cl............................ 340/52 F; 340/248 E
[51] Int. Cl.[2]........................................ G08B 19/00
[58] Field of Search............ 340/52 C, 52 F, 59, 60, 340/167 R, 248 A, 248 B, 248 E, 150; 307/10 R

[56] References Cited
UNITED STATES PATENTS
| | | | |
|---|---|---|---|
| 3,651,454 | 3/1972 | Venema et al................. | 307/10 R X |
| 3,683,197 | 8/1972 | Ives..................................... | 307/10 R |
| 3,742,447 | 6/1973 | Sognefest et al.................. | 340/52 F |

*Primary Examiner*—Alvin H. Waring
*Attorney, Agent, or Firm*—Waters, Schwartz & Nissen

[57] ABSTRACT

A vehicle warning system for a tractor trailer vehicle has a first unit mounted on the tractor and a second unit mounted on the trailer. A single electrical signal carrying line interconnects these units, and different faults on the trailer cause different signals to flow along this line and give different warnings on the tractor.

2 Claims, 2 Drawing Figures

VEHICLE WARNING SYSTEMS

This invention relates to a vehicle warning system and has as its object the provision of such a system in a convenient form.

In accordance with the present invention there is provided a tractor-trailer vehicle having a warning system comprising a first unit mounted on the tractor, a second unit mounted on the trailer, and a single electrical signal carrying line connected between said first and second units, said second unit including first and second switch means operable in response to at least two trailer conditions respectively, said first and second switch means when operated varying the electrical signal on said single line by a different degree and said first unit including means operable in response to said electrical signal to provide an indication of the nature of the condition.

It will be appreciated that in addition to the single line mentioned above, there will be the usual interconnections between the tractor and trailer providing power from the tractor battery to loads on the trailer and an earth return from the trailer to the tractor.

Preferably, the first and second swtich means operate in response respectively to two different failures on the trailer, for example failure of a trailer lamp and failure in pressure of the brake fluid supplied to the trailer brakes.

Figure 1:
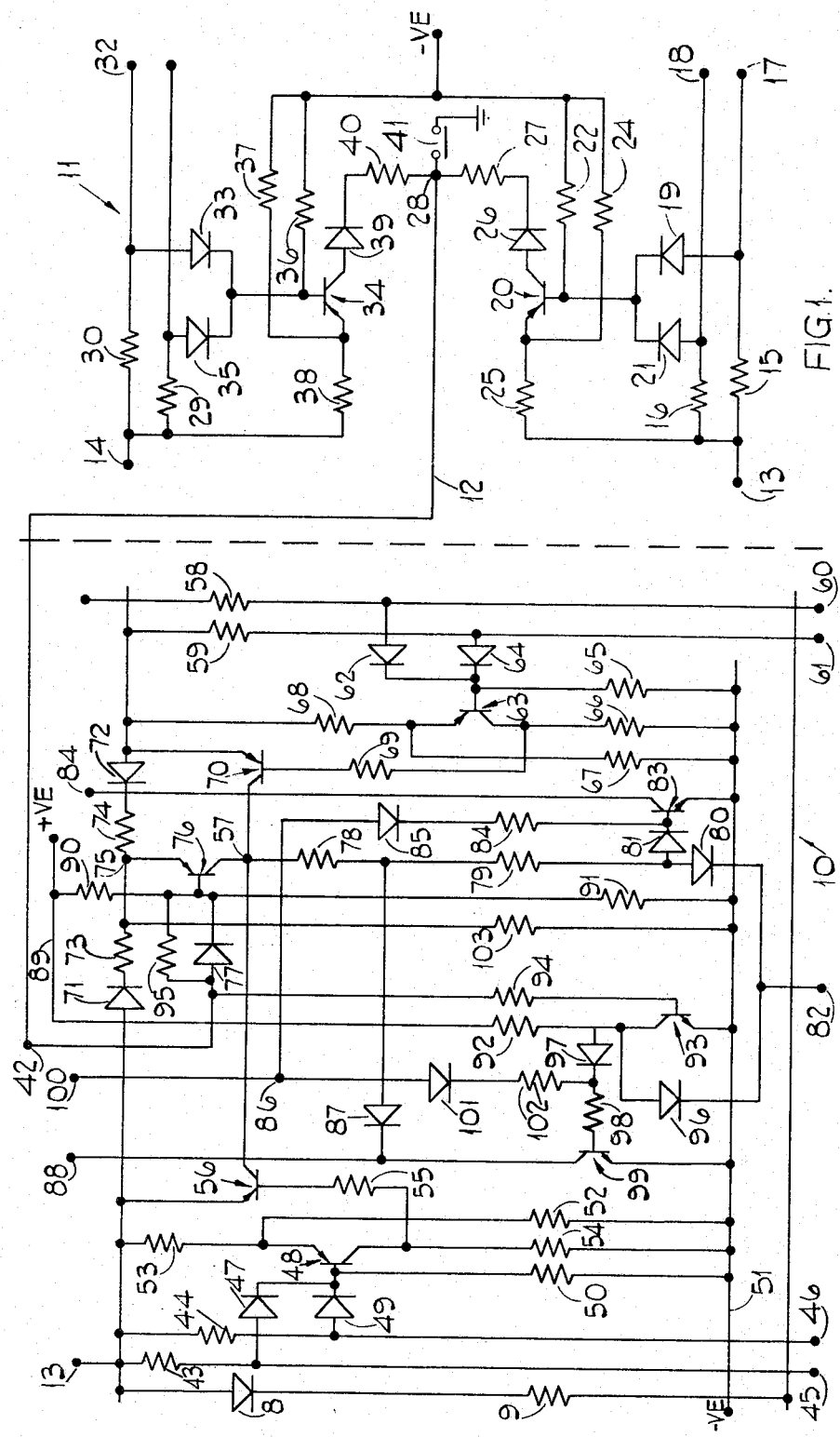
Figure 2:
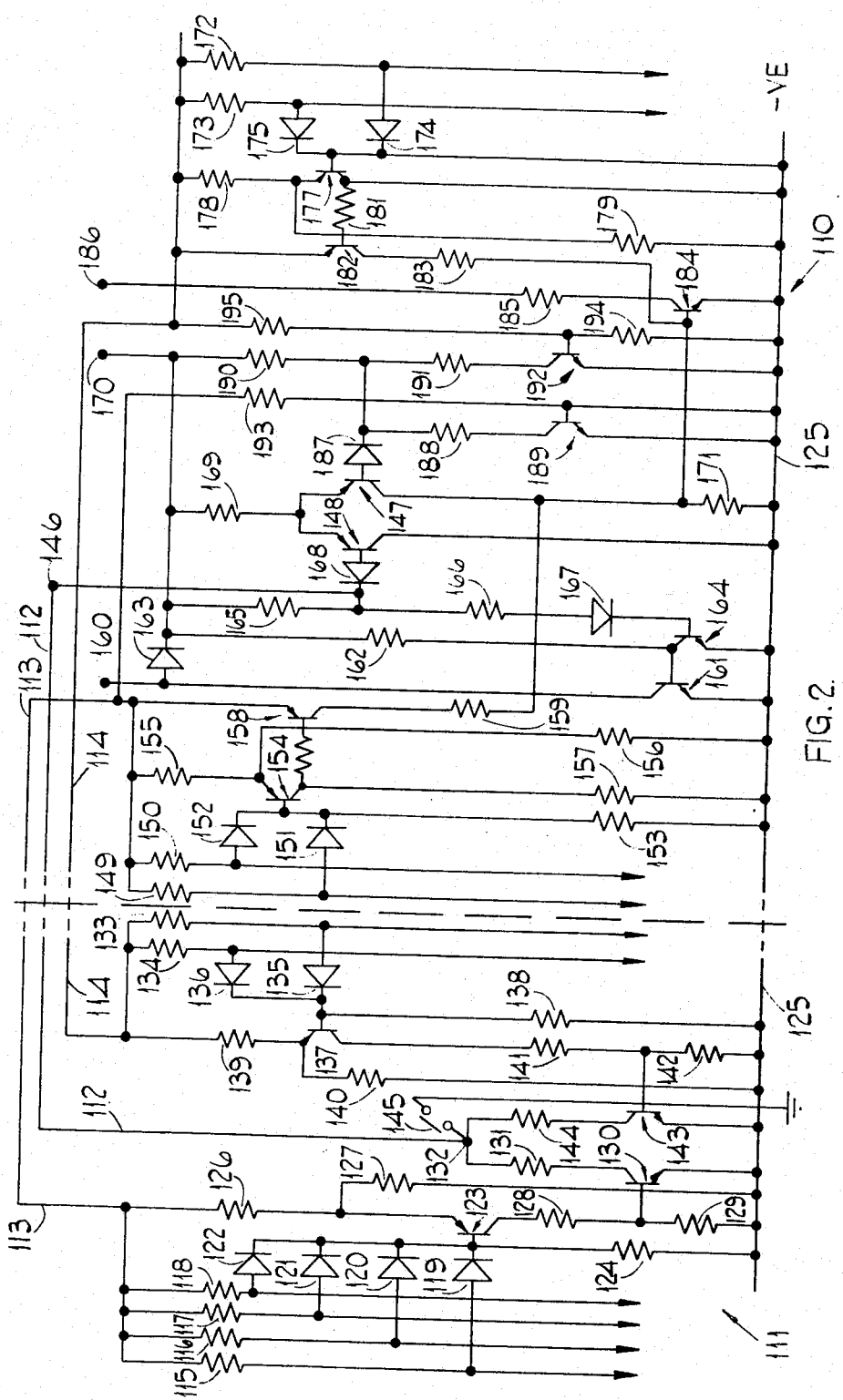

The invention will now be more particularly described with reference to the accompanying drawings wherein:

FIG. 1 is a circuit diagram illustrating one embodiment of a vehicle warning system constructed in accordance with the present invention, and FIG. 2 is a circuit diagram illustrating a modified embodiment of a vehicle warning system constructed in accordance with the present invention.

Referring to the drawing, the vehicle warning system shown therein is intended for use with a vehicle towing a trailer. The warning system comprises a first unit indicated by the reference numeral 10 arranged on the towing vehicle, (IE. the tractor) and a second unit which is indicated by the reference numeral 11 and which is mounted on the trailer being towed by the vehicle. Only a single electrical signal carrying line 12 is connected between the first and second units 10 and 11 respectively. However, a common side light supply 13 is provided for both the side lights mounted on the trailer and on the towing vehicle, and is indicated by the reference numeral 13. Moreover, a common brake light supply is provided for both the brake lights mounted on the trailer and on the towing vehicle, and is indicated by the reference numeral 14. The terminal 13 is connected to a negative supply through a diode 8 and the resistor 9 in series.

Considering first of all the second unit 11 which is mounted on the trailer, the unit 11 comprises a first pair of resistors 15, 16, one end of each of which is connected to the side light supply 13 and the other ends of which are connected at terminals 17 and 18 respectively to the two tail lamps (not shown) mounted on the trailer. The junction of the resistor 15 and the terminal 17 is connected to the anode of a diode 19 the cathode of which is connected to the base of a p-n-p transistor 20, and the junction of the resistor 16 and the terminal 18 is connected to the anode of a diode 21 the cathode of which is also connected to the base of the transistor 20. The base of the transistor 20 is also connected through a resistor 22 to a negative supply rail 23 which is also connected through a resistor 24 to the emitter of the transistor 20. The latter is also connected to the side light supply 13 through a resistor 25, and the collector of the transistor 20 is connected to the anode of a diode 26 the cathode of which is connected through a resistor 27 to a terminal 28.

The unit 11 also comprises a further pair of resistors 29 and 30 one end of each of which is connected to the brake light supply 14 and the other ends of which are connected respectively to terminals 31 and 32 which are in turn connected to the two brake lamps mounted on the trailer. The junction of the resistor 30 and the terminal 32 is connected to the anode of a diode 33 the cathode of which is connected to the base of a p n p transistor 34, and the junction of the resistor 29 and the terminal 31 is connected to the anode of a further diode 35 the cathode of which is also connected to the base of the transistor 34. The latter is also connected through a resistor 36 the negative supply rail 23. The emitter of the transistor 34 is connected through a resistor 37 to the negative supply rail 23 and is also connected to the anode of a diode 39 the cathode of which is connected through a resistor 40 to a terminal 28.

Furthermore, the terminal 28 is connected to one terminal of a normally open switch 41, the other terminal of which is connected to ground. The switch 41 is responsive to the pressure of fluid in the supply lines to the trailer brakes, such that if this pressure drops, due for instance to a fracture in the supply line from the towing vehicle, the switch 41 will close. Finally, the terminal 28 is connected to one end of the electrical signal carrying line 12, the other end of which is connected to a terminal 42 which forms part of the unit 10 mounted on the towing vehicle. The junction between the terminal 45 and the resistor 43 is connected to the anode of a diode 47 the cathode of which is connected to the base of a p n p transistor 48, and the junction between the resistor 44 and the terminal 46 is connected to the anode of a further diode 49 the cathode of which is also connected to the base of the transistor 48. The latter is also connected through a resistor 50 to a negative supply rail 51 which is common to the supply rail 23, and the emitter of the transistor 48 is connected on the one hand through a resistor 52 to the negative supply rail 51 and on the other hand through a resistor 53 to the side light supply 13. The collector of the transistor 48 is connected on the one hand through a resistor 54 to the negative supply rail 51 and on the other hand through a resistor 55 to the base of a further p n p transistor 56 the emitter of which is directly connected to the side light supply 13. The collector of the transistor 56 is connected to a terminal 57.

The unit 10 comprises a further pair of resistors 58 and 59 one end of each of which is connected to the brake light supply 14, and the other ends of which are connected respectively to two terminals 60 and 61 respectively which are in turn connected to the two brake lamps (not shown) mounted on the towing vehicle. The junction of the resistor 58 and the terminal 60 is connected to the anode of a diode 62 the cathode of which is connected to the base of a p n p transistor 63, and the junction between the resistor 59 and the terminal 61 is connected to the anode of a further diode 64 the cathode of which is also connected to the base of the transistor 63. The latter is also connected through a resistor 65 to the negative supply line 51 and the collector and emitter of the transistor 63 are connected respectively through resistors 66 and 67 also to the negative supply rail 51. Also, the emitter of the transistor 63 is connected through a resistor 68 to the brake light supply 14. The collector of the transistor 63 is further connected through a resistor 69 to the base of a p n p transistor 70, the emitter of which is connected directly to the brake light supply 14, and the collector of which is connected to the terminal 57. The side light supply 13 and the brake light supply 14 are, in addition connected respectively to the anodes of diodes 71 and 72; the cathodes of which are respectively connected through resistors 73 and 74 to a terminal 75. The terminal 75 is also connected to the rail 51 through a resistor 103 which together with the resistors 73 and 74 sets the correct voltage at the emitter of the transistor 76. A p n p transistor 76 has its emitter connected to the terminal 75, its collector connected to the terminal 57, and its base connected to the cathode of a diode 77 the anode of which is connected to the terminal 42. The terminal 57 is also connected through a pair of series connected resistors 78 and 79 to the anodes of two diodes 80 and 81 the cathode of the diode 80 being connected to a terminal 82 and the cathode of the diode 81 being connected to the base of an n p n transistor 83. The emitter of the transistor 83 is connected to the negative supply rail 51 and the collector of the transistor 83 is connected to a terminal 84 which is connected to a bulb failure warning light mounted on the towing vehicle within view of the driver. The junction between the cathode of the diode 81 and the base of the transistor 83 is connected through a resistor 84 to the cathode of a diode 85 the anode of which is connected to a terminal 86. The junction between the resistors 78 and 79 is connected to the anode of a diode 87 and the cathode of which is connected to a terminal 88.

A positive supply rail 89 is provided and is connected on the one hand through resistor 90 to the base of the transistor 76 which is in turn connected through a resistor 91 to the negative supply rail 51 and on the other hand through a resistor 92 to the collector of an n p n transistor 93 the emitter of which is connected to the negative supply rail 51. The base of the transistor 93 is connected through a resistor 94 to the anode of the diode 77 which is bridged by a resistor 95. The collector of the transistor 93 is also connected to the anode of a diode 96 the cathode of which is connected to the terminal 82. The collector of the transistor 93 is also connected to the anode of a diode 97 the cathode of which is connected through a resistor 98 to the base of an n p n transistor 99 and the emitter of which is connected to the negative supply line 51. The collector of the transistor 99 is connected to the terminal 88 which is also connected to a brake pressure failure warning light mounted on the towing vehicle within view of the driver of the vehicle.

Finally, a terminal 100 to which a circuit check signal can be applied is connected on the one hand to the terminal 86 and on the other hand to the anode of a diode 101 the cathode of which is connected through a resistor 102 to the junction between the resistor 98 and the diode 97.

In operation, and considering first of all operation of the unit 11 mounted on the trailer, assuming that one of the tail lamps fails, transistor 20, which is normally turned on, will turn off, and the electrical signal normally applied to the line 12 when both transistors 20 and 34 are turned on will be reduced, such reduction turning transistor 76 on through resistor 91. When transistor 76 turns on base current will be supplied to turn on transistor 83 which will cause energisation of the bulb failure warning light mounted on the road vehicle. Moreover, if one of the brake lamps mounted on the trailer fails, the transistor 34, which is normally turned on, will turn off due to reverse biassing of its emitter-base junction and this will also cause the signal on the line 12 to be reduced. This in turn will cause transistors 76 and 83 to turn on thereby energising the bulb failure warning light once again.

If the pressure of brake fluid falls on the trailer such as for instance because of a fracture in the supply line between the trailer and the towing vehicle then the switch 41 will close thereby connecting the terminal 28 to ground and reducing the signal on the line 12 to zero. As before, this causes transistor 76 to turn on which, in turn, turns on transistor 83 thereby energising the bulb failure warning light. In addition, transistor 93, which is normally turned on by the normal or the reduced signal on the line 12, turns off. This in turn allows sufficient base current to pass to the transistor 99 which will turn on, thereby energising the brake pressure warning light mounted on the road vehicle.

Turning now to the tail and brake lamps mounted on the towing vehicle, if one of these tail lamps fails, transistor 48 which is normally turned on, will turn off due to reverse biassing of the emitter base junction and in turn transistor 56 will turn on. This will supply sufficient base current to the transistor 83 to turn the latter on thereby energising the bulb failure warning light mounted on the towing vehicle.

In a similar manner if either of the brake lamps mounted on the towing vehicle fails transistor 63 will turn off which in turn will turn on transistor 70 and this will supply base current to the transistor 83 once again turning it on to energise the bulb failure warning light.

It is to be appreciated that if any light supply fails then the bulb failure warning light will be energised.

Provision is made to check the brake pressure failure warning light and the bulb failure warning light by applying a positive signal to terminal 100. This will cause transistors 83 and 99 to turn on to energise both the warning lights. Finally, to prevent a continuous fault indication if the towing vehicle is used without its trailer, the terminal 42 must be connected to a dummy supply on the towing vehicle.

Referring now to FIG. 2, the vehicle warning system shown therein is also intended for use with a vehicle towing a trailer. The warning system comprises a first unit indicated by the reference numeral 110 arranged on the towing vehicle, and a second unit which is indicated by the reference numeral 111 and which is mounted on the trailer being towed by the vehicle. Only a single electrical signal carrying line 112 (other than a common return line) is connected between the first and second units 110 and 111 respectively. However, a common side and tail light supply 113 is provided for both the side lights mounted on the towing vehicle and the tail lights mounted on the towing vehicle and on the trailer. Moreover, a common brake light supply 114 is provided for both the brake lights mounted on the trailer and on the towing vehicle.

Considering first of all the second unit 111 which is mounted on the trailer, this unit comprises four resistors 115, 116, 117 and 118, one end of each of which is connected to the supply 113 and the other ends of which are connected to four tail lamps (not shown) mounted on the trailer. The aforesaid other ends of the resistors 115, 116, 117 and 118 are connected respectively to anodes of diodes 119, 120, 121 and 122, the cathodes of which are connected on the one hand to the base of a transistor 123 and on the other hand through a resistor 124 to a negative supply rail 125. The emitter of the transistor 123 is connected on the one hand to a resistor 126 to the terminal 113 and on the other hand through a resistor 127 to the supply rail 125. The collector of the transistor 123 is connected through a pair of series connected resistors 128 and 129 to the supply rail 125, the junction of the resistors 128 and 129 being connected to the base of an n p n transistor 130. The emitter of the transistor 130 is connected to the supply rail 125 whilst its collector is connected through a resistor 131 to a terminal 132.

The unit 111 also includes a pair of resistors 133 and 134 one end of each of which is connected to the terminal 114 and the other ends of the resistors 133 and 134 are connected respectively to two brake lamps mounted on the trailer. The aforesaid other ends of the resistors 133 and 134 are also connected respectively to the anodes of two diodes 135 and 136, the cathodes of which are on the one hand connected to the base of a p n p transistor 137 and on the other hand through a resistor 138 to the supply rail 125. The emitter of the transistor 137 is connected on the one hand through a resistor 139 to the terminal 114 and on the other hand through a resistor 140 to the supply rail 125. The collector of the transistor 137 is connected to the supply rail 125 through a pair of series connected resistors 141 and 142, the junction of which is connected to the base of an n p n transistor 143. The emitter of the transistor 143 is connected to the supply rail 125 and the collector of the transistor 143 is connected through a resistor 144 to the terminal 132. Furthermore, the terminal 132 is connected to one contact of a normally open switch 145, the other contact of which is connected to ground. The switch 145 is responsive to the pressure of fluid in the supply lines to the trailer brakes, such that if this pressure drops, due for instance to a fracture in the supply line from the towing vehicle, the switch 145 will close. Finally, the terminal 132 is connected through the electrical signal carrying line 112 to a terminal 146 which forms part of the unit 110 mounted on the towing vehicle.

Turning now to the unit 110 which is mounted on the towing vehicle, this unit comprises a pair of p n p transistors 147 and 148, the emitters of which are connected together, and these transistors form a differential detector. The unit 110 also includes a pair of resistors 149 and 150 one end of each of which is connected to the brake light supply at terminal 113 and the other ends of which are connected respectively to two brake lamps mounted on the towing vehicle. The aforesaid other ends of the resistors 149 and 150 are connected respectively to the anodes of diodes 151 and 152, the cathodes of which are on the one hand connected through a resistor 153 to the common negative supply rail 125 and on the other hand to the base of a p n p transistor 154. The emitter of the transistor 154 is connected on the one hand through a resistor 155 to the terminal 113 and on the other hand through a resistor 156 to the negative supply rail 125. The collector of the transistor 154 is connected on the one hand through a resistor 157 to the supply rail 125 and on the other hand to the base of a p n p transistor 158, the emitter of which is connected to the terminal 113. The collector of the transistor 158 is connected through a resistor 159 to the collector of the transistor 147. A terminal 160 is connected to a brake pressure failure warning device which may be a buzzer or a warning light, and this terminal 160 is connected to the collector of an n p n transistor 161 the emitter of which is connected to the supply rail 125. The base of the transistor 161 is connected on the one hand through a resistor 162 to the cathode of a diode 163 the anode of which is connected to the terminal 160, and on the other hand to the collector of an n p n transistor 164 the emitter of which is connected to the supply rail 125. The cathode of the diode 163 is connected through a pair of series connected resistors 165 and 166 to the anode of a diode 167 the cathode of which is connected to the base of the transistor 164. The junction between the resistors 165 and 166 is connected on the one hand to the cathode of a diode 168 the anode of which is connected to the base of the transistor 148, and on the other hand to the terminal 146. The emitters of the transistors 147 and 148 are connected through a resistor 169 to the cathode of the diode 163 which is also connected to a terminal 170 connected in turn to the ignition supply of the road vehicle. The collector of the transistor 148 is connected to the supply rail 125 and the collector of the transistor 147 is connected through a resistor 171 to the supply rail 125.

The unit 110 comprises a further pair of resistors 172 and 173, one end of each of which is connected to the brake light supply 114, and the other ends of which are connected respectively to two brake lamps (not shown) mounted on the towing vehicle. The aforesaid other ends of the resistors 172 and 173 are respectively connected to the anodes of diodes 174 and 175 the cathodes of which are connected on the one hand through a resistor 176 to the supply rail 125 and on the other hand to the base of a p n p transistor 177. The emitter of the transistor 177 is connected on the one hand through a resistor 178 to the brake supply terminal 114 and on the other hand through a resistor 179 to the supply rail 125. The collector of the transistor 177 is connected on the one hand through a resistor 180 to the supply rail 125 and on the other hand through a resistor 181 to the base of a p n p transistor 182 the emitter of which is connected to the brake supply terminal 114. The collector of the transistor 182 is connected through a resistor 183 to the base of an n p n transistor 184, the emitter of which is connected to the supply rail 125. The collector of the transistor 184 is connected to a resistor 185 to a terminal 186 which is in turn connected to a lamp failure warning device such as a warning light (not shown). The base of the transistor 184 is also connected to a collector of the transistor 147. The base of the transistor 147 is connected to the anode of a diode 187 the cathode of which is connected on the one hand through a resistor 188 to the collector of a transistor 189 and on the other hand to the junction of a pair of series connected resistors 190 and 191 which are connected between the terminal 170 and the collector of an n p n transistor 192. The emitters of the transistors 189 and 192 are both connected to the supply rail 125. The base of the transistor 199 is connected on the one hand to the supply rail 125 and on the other hand through a resistor 193 to the terminal 113. The base of the transistor 192 is connected on the one hand through a resistor 194 to the supply rail 125 and on the other hand through a resistor 195 to the brake supply terminal 114. Finally, the portion of the supply rail 125 mounted on a towing vehicle is connected through a resistor 196 to a terminal 197.

In operation, and considering first of all operation of the unit 111 mounted on the trailer, assuming that one of the tail lamps fails, transistor 123, which is normally turned on, will turn off and this will in turn cause transistor 130 to turn off. Thus, the electrical signal normally applied to the line 112 will be reduced. Such reduction in signal on the line 112 will cause the transistor 148 to conduct less current whereupon the transistor 147 conducts more current, thereby turning on transistor 184 so as to illuminate the lamp failure warning light connected to the terminal 186. However, the transistor 164 which is normally turned on will remain on.

If either of the brake lamps mounted on the trailer fails, then transistor 137 which is normally turned on will turn off, thereby turning transistor 143 off so that the electrical signal normally applied to the line 112 will again be reduced, such reduction reducing the conduction of the transistor 148 and thereby increasing conduction of the transistor 147 to thereby once again turn on transistor 184 which causes the bulb failure warning lamp to be illuminated.

If the pressure of brake fluid falls on the trailer such as for instance because of a fracture in the supply line between the trailer and the towing vehicle then the switch 145 will close thereby connecting the terminal 132 to ground and reducing a signal on the line 112 to zero. This will remove base current from the normally turned on transistor 164, thereby turning this transistor off and in turn turning on transistor 161 which will cause energisation of the brake pressure failure warning device.

Turning now to the tail and side lamps mounted on the towing vehicle, if one of these lamps fails, transistor 154 which is normally turned on, will turn off due to reverse biassing the emitter base junction and in turn transistor 158 will turn on. In consequence, transistor 184 will turn on through resistor 159 to thereby illuminate the lamp failure warning light connected to terminal 186. Moreover, if either of the brake lamps mounted on the towing vehicle fails, then transistor 117, which is normally turned on, will turn off, thereby turning on transistor 182 which will supply base current to transistor 184 through resistor 183 to turn on transistor 184 and thereby once again illuminate the bulb failure warning lamp connected to terminal 186.

Resistors 165, 188, 190, 191, 131 and 144 set up the correct voltage levels on line 112 relative to the negative supply rail 125, the only positive supply used for this purpose being the ignition supply, 170.

Finally, to prevent a continuous fault indication when the towing vehicle is used without its trailer, the terminal 197 is connected to the terminal 146.

We claim:

1. A tractor-trailer vehicle having a warning system comprising a first unit mounted on the tractor, a second unit mounted on the trailer, and a single electrical signal carrying line connected between said first and second units, said second unit including first and second switch means operable in response to at least two trailer conditions respectively, said first and second switch means when operated varying the electrical signal on said single line by a different degree and said first unit including means operable in response to said electrical signal to provide an indication of the nature of the condition, said first and second switch means operating in response respectively to two different failures on the trailer, having a predetermined current flow when neither switch means is operated, the first switch means serving when operated to reduce the current to a first level and a second switch means serving when operated to reduce the current to a second and lower level, the tractor including a first warning device which is operated when the current falls to the first level and a second warning device which is operated when the current falls to the second level.

2. A vehicle as claimed in claim 1 in which the second level is zero.

* * * * *